(12) United States Patent     (10) Patent No.: US 8,505,700 B2
Beringer     (45) Date of Patent: Aug. 13, 2013

(54) SECURITY BRAKING DEVICE MOUNTED BETWEEN A HYDRAULIC FUEL TANK AND ACTUATION MEMBERS CAPABLE OF ACTING ON BRAKING MEMBERS

(75) Inventor: Remi Beringer, Chatelneuf (FR)

(73) Assignee: Beringer SAS, Saint Jean d'Ardieres (FR)

(*) Notice: Subject to any disclaimer, the term of this patent is extended or adjusted under 35 U.S.C. 154(b) by 914 days.

(21) Appl. No.: 12/595,983

(22) PCT Filed: Mar. 26, 2008

(86) PCT No.: PCT/FR2008/050521
§ 371 (c)(1),
(2), (4) Date: Dec. 11, 2009

(87) PCT Pub. No.: WO2008/139072
PCT Pub. Date: Nov. 20, 2008

(65) Prior Publication Data
US 2010/0116604 A1     May 13, 2010

(30) Foreign Application Priority Data
Apr. 18, 2007 (FR) .................................. 07 54537

(51) Int. Cl.
*F16D 69/00* (2006.01)
(52) U.S. Cl.
USPC .......................................... 188/265; 244/111

(58) Field of Classification Search
USPC ............... 188/265, 3 R, 4 R; 244/111, 110 A
See application file for complete search history.

(56) References Cited

U.S. PATENT DOCUMENTS

| | | | |
|---|---|---|---|
| 2,409,335 A | 10/1946 | Von Stackelberg | |
| 2,759,690 A * | 8/1956 | Dewar | ........................... 244/111 |
| 2,926,873 A | 3/1960 | Dewar | |
| 3,630,575 A * | 12/1971 | Fowler | ............................... 303/7 |
| 6,193,326 B1 | 2/2001 | Ybert | |

FOREIGN PATENT DOCUMENTS

| EP | 0982740 A | 7/1999 |
|---|---|---|
| FR | 730775 A | 8/1932 |

OTHER PUBLICATIONS

International Search Report for PCT/FR2008/050521 dated Nov. 6, 2008.

* cited by examiner

*Primary Examiner* — Pamela Rodriguez
(74) *Attorney, Agent, or Firm* — Heslin Rothenberg Farley & Mesiti P.C.

(57) ABSTRACT

The device includes a loading and non-compression locking mechanism for a master cylinder hydraulically connected to a hydraulic fuel tank and to braking members. The mechanism is dependent upon a control member capable of unlocking the mechanism in order to concomitantly urge the master cylinder to apply a predetermined hydraulic pressure for acting on the braking members.

9 Claims, 7 Drawing Sheets

SECURITY BRAKING DEVICE MOUNTED BETWEEN A HYDRAULIC FUEL TANK AND ACTUATION MEMBERS CAPABLE OF ACTING ON BRAKING MEMBERS

CROSS REFERENCE TO RELATED APPLICATIONS

This application is a national stage filing under section 371 of International Application No. PCT/FR2008/050521 filed on Mar. 26, 2008, and published in French on Nov. 20, 2008 as WO 2008/139072 and claims priority of French application No. 0754537 filed on Apr. 18, 2007, the entire disclosure of these applications being hereby incorporated herein by reference.

BACKGROUND ART

The invention relates to a security braking device.

In a general way, this device is intended to be mounted between a hydraulic fluid tank and actuation members capable of acting on braking members.

The invention can be used to particular advantage when fitted to the brake systems of aircraft weighing less than 5.7 tonnes, in accordance with the international standards currently in force.

It will be recalled that, in a known way, in this type of aircraft, the brakes are mounted onto the main undercarriage wheels and are actuated hydraulically by means of a right pedal and a left pedal. Each of the pedals acts on a master cylinder connected to the braking members of each of the wheels. The brakes are actuated separately by the right and left pedals, thereby also making it possible, as a function of the force applied to one of the pedals, to urge a single master cylinder to pressure for example, in order to lock or slow down one of the wheels thereby, concomitantly, allowing the aircraft to rotate as it moves forward, with a more or less substantial turning radius depending on the pressure applied.

However, with this braking system, it is very difficult to ensure straight-line braking. Indeed, straight-line braking requires identical force on both wheels, this being conveyed by an identical pressure force on each of the two pedals. In reality, it is very difficult, if not almost impossible, to apply an identical pressure force to each of the pedals. When an aircraft is moving around the runway, at very low speed, the consequences of this pressure fluctuation on each of the pedals may be acceptable. This is not however the case when the aircraft reaches high speed, on landing or on takeoff. If, for whatever reason (lack of engine power, too high a speed, etc.), the pilot is forced to apply so-called emergency braking, there is a very high risk of locking one wheel relative to the other thereby immediately causing swiveling and loss of control of the aircraft trajectory, with significant risk of overturning.

Studies have shown that a quarter of the accidents involving this type of aircraft weighing less than 5.7 tonnes occur on landing or on takeoff, subsequent to emergency braking being applied.

The stated purpose of the invention is to overcome these drawbacks in a straightforward, safe, effective and rational way.

BRIEF SUMMARY OF INVENTION

The problem the invention sets out to resolve is that of fitting to the brake system of this type of aircraft (less than 5.7 tonnes) an entirely mechanical device that allows the pilot to apply emergency braking while automatically distributing the hydraulic pressure, equally, in each of the braking members of each of the wheels of the aircraft.

To resolve said problem, a security braking device has been designed and perfected which includes a loading and non-compression position locking mechanism for a master cylinder hydraulically connected to the tank and to the braking members, said mechanism being dependent upon a control member capable of unlocking the same in order to concomitantly urge the master cylinder so that the latter applies a predetermined hydraulic pressure for acting on the braking members.

To resolve the problem as posed of producing an entirely mechanical device, the loading mechanism comprises:

an articulated lever connected by a link rod system to one of the ends of the body of the master cylinder;

a rocking member coupled, in an articulated way, to the master cylinder piston rod, said rocking member being dependent upon a resilient return member capable of storing energy;

a swiveling hook connected to the control member and capable of engaging with a part of the rocking member to hold it in the locked position corresponding to the non-compression of the master cylinder, said hook being returned into the locked position by a spring.

To resolve the problem as posed of providing an automatic control of the security braking device, the control member is coupled to a part of the rocking member so as to cause said rocking member, as said member is urged, to swivel and to unlock so as to urge the master cylinder piston rod in order to apply the hydraulic pressure.

Given the underlying features of the inventive device, in one position of the lever, corresponding to a so-called stop position, the resilient return member is not compressed, the rocking member is locked and the master cylinder not urged to pressure, whereas in another position of the lever, corresponding to a so-called loaded position, the resilient member is compressed, the rocking member is locked and the master cylinder not urged to pressure.

In one embodiment, the resilient return member is a gas actuator. One of the ends of the gas actuator is articulated on an axis of the rocking member, the other end of said actuator being coupled to the link rod system.

To resolve the problem as posed of controlling rocking member swiveling, the link rod system includes at least one main elbow link rod articulated on a part of the operating lever and at least one rectilinear linkage articulated on one of the ends of the link rod and on the end of the master cylinder body.

According to another feature, the control member is a cable that can be actuated manually or automatically by being acted upon.

To resolve the problem as posed of being able to access the inventive device and control it on demand, it is built into a sealed housing that offers arrangements for actuating the loading lever and the control member.

As shown, the device can be used to particular advantage in the case of a braking system of an aircraft weighing less than 5.7 tonnes, with the master cylinder being hydraulically connected to the hydraulic fluid tank and, by means of a T, to each of the master cylinders originally offered by the aircraft braking system corresponding to each of the wheels and separately actuated by pedals.

BRIEF DESCRIPTION OF DRAWING FIGURES

The invention is disclosed hereinafter in further detail using the figures in the appended drawings wherein.

Figure 5:
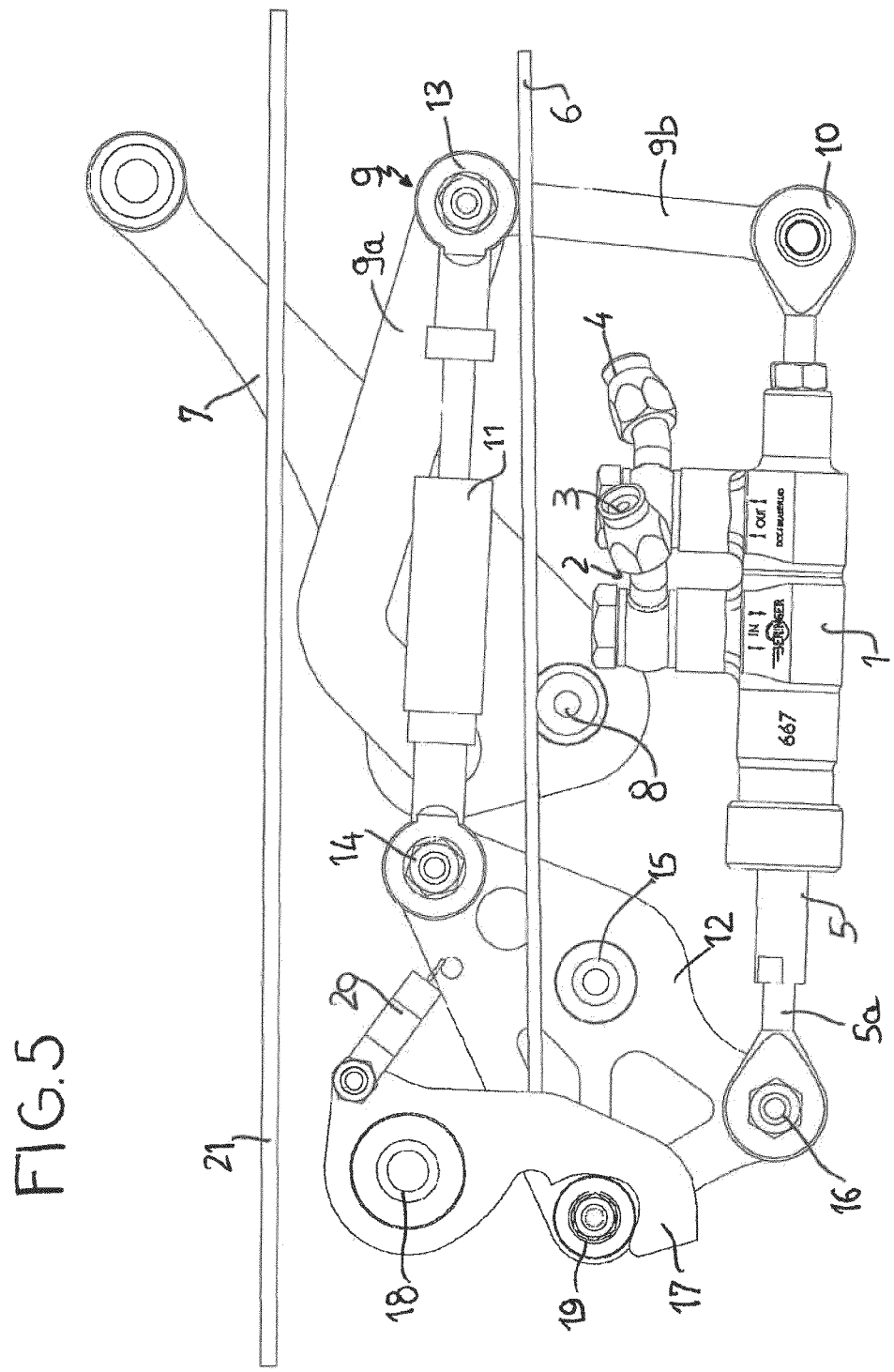
FIGS. 5, 6 and 7 are partial cross-section views showing the main operating phases, namely.
Figure 6:
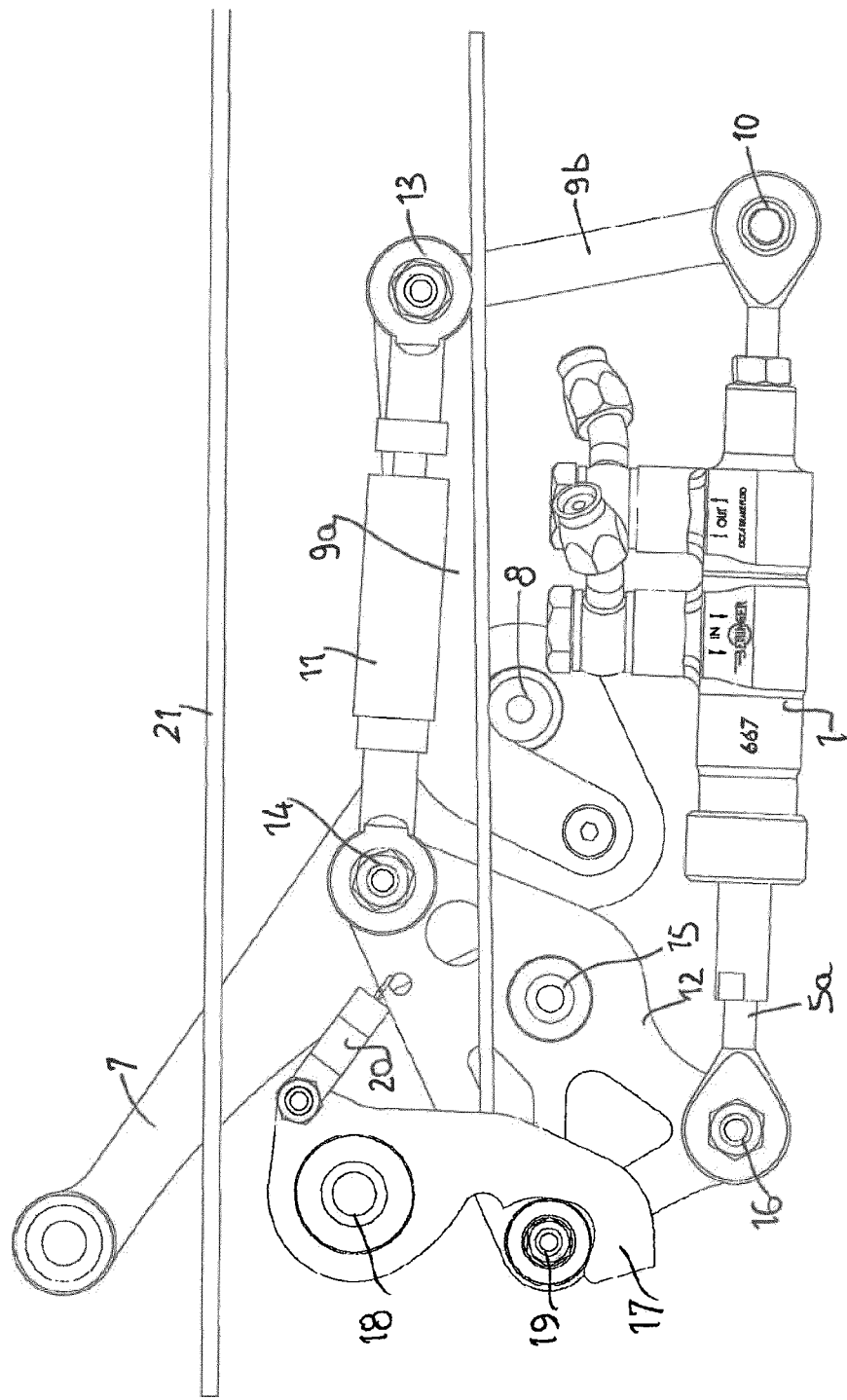
Figure 7:
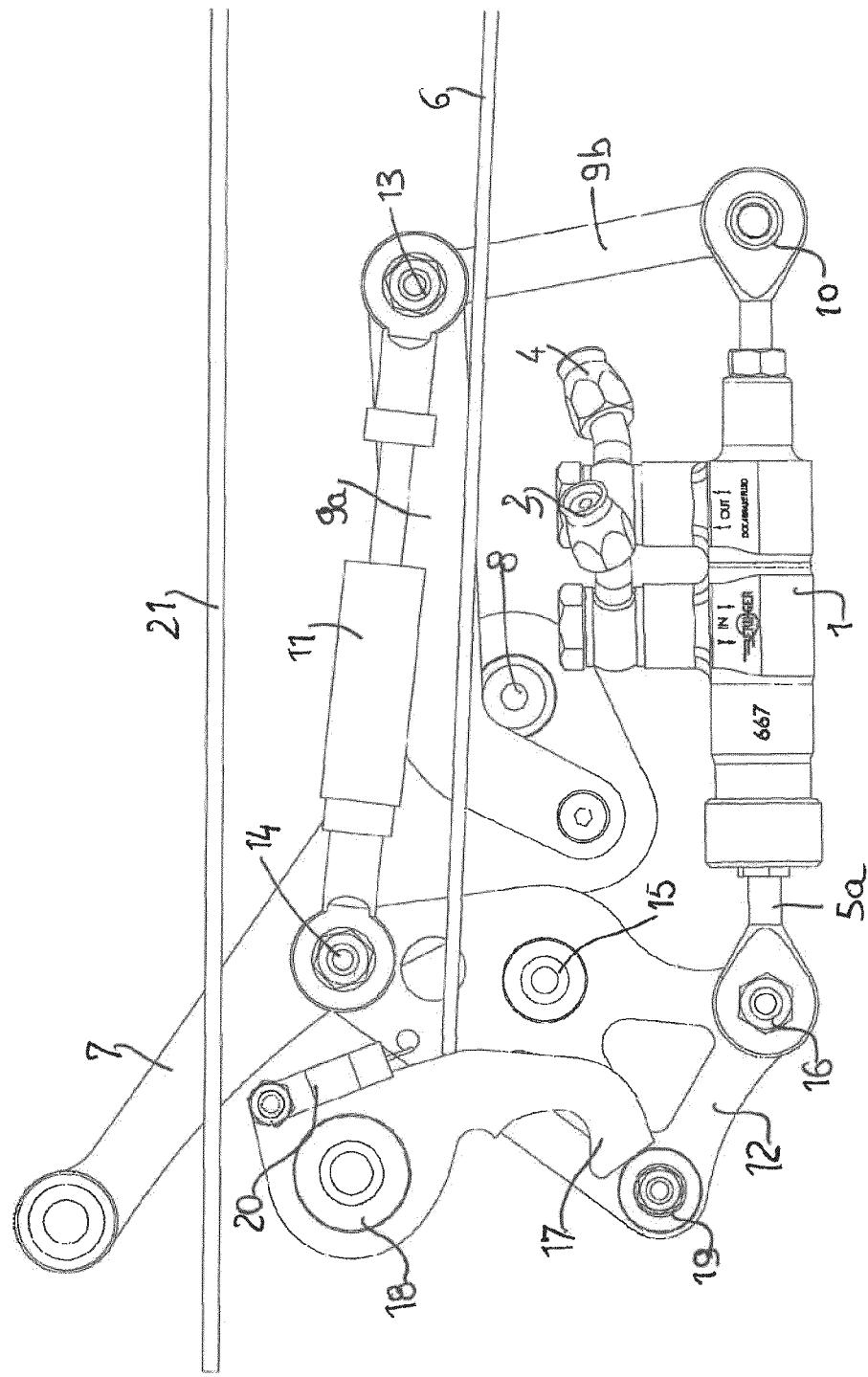

FIG. 5: stop position,

FIG. 6: loaded position,

FIG. 7: automatic braking position.

Figure 1:
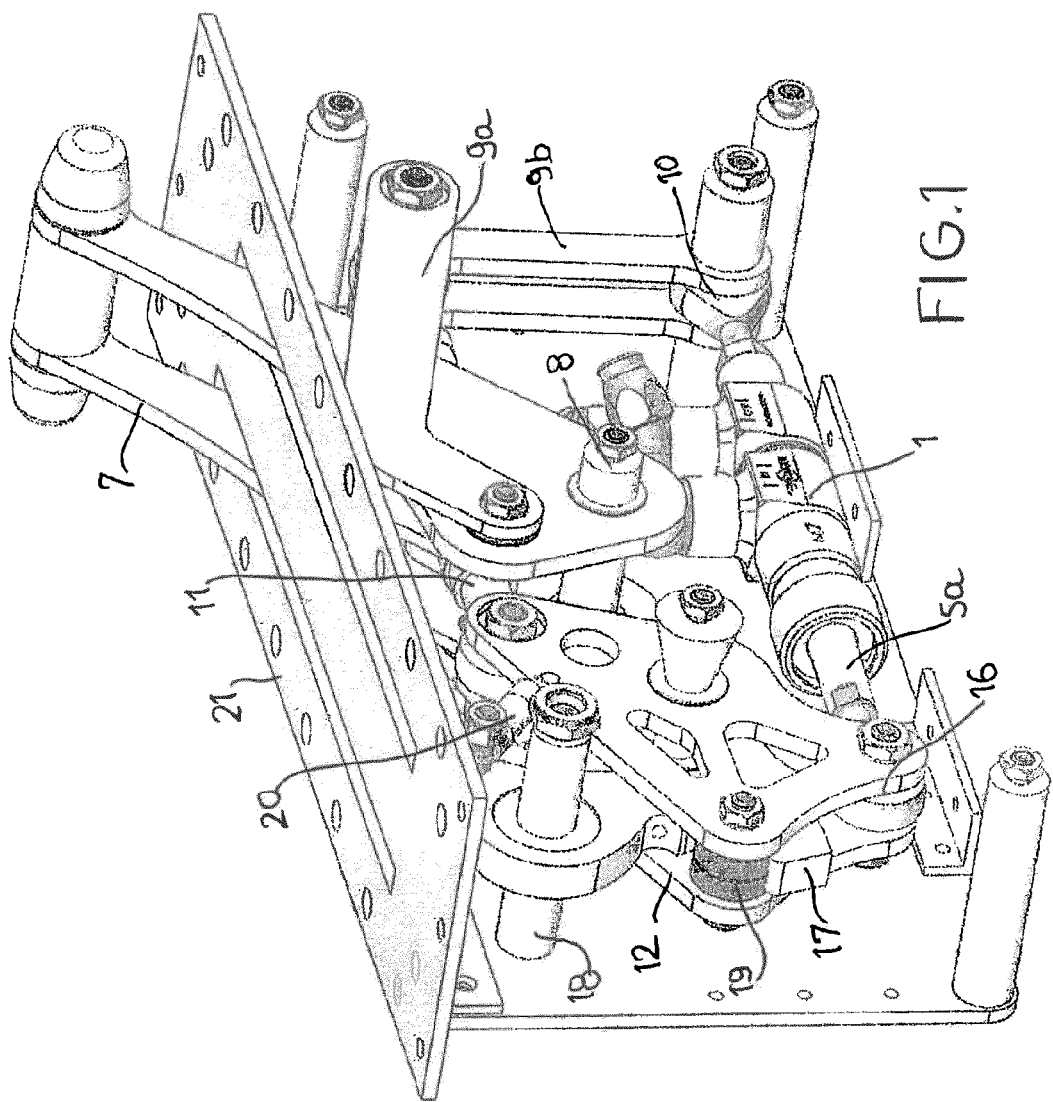
FIG. 1 is a perspective view of one embodiment of the inventive security braking device.
Figure 2:
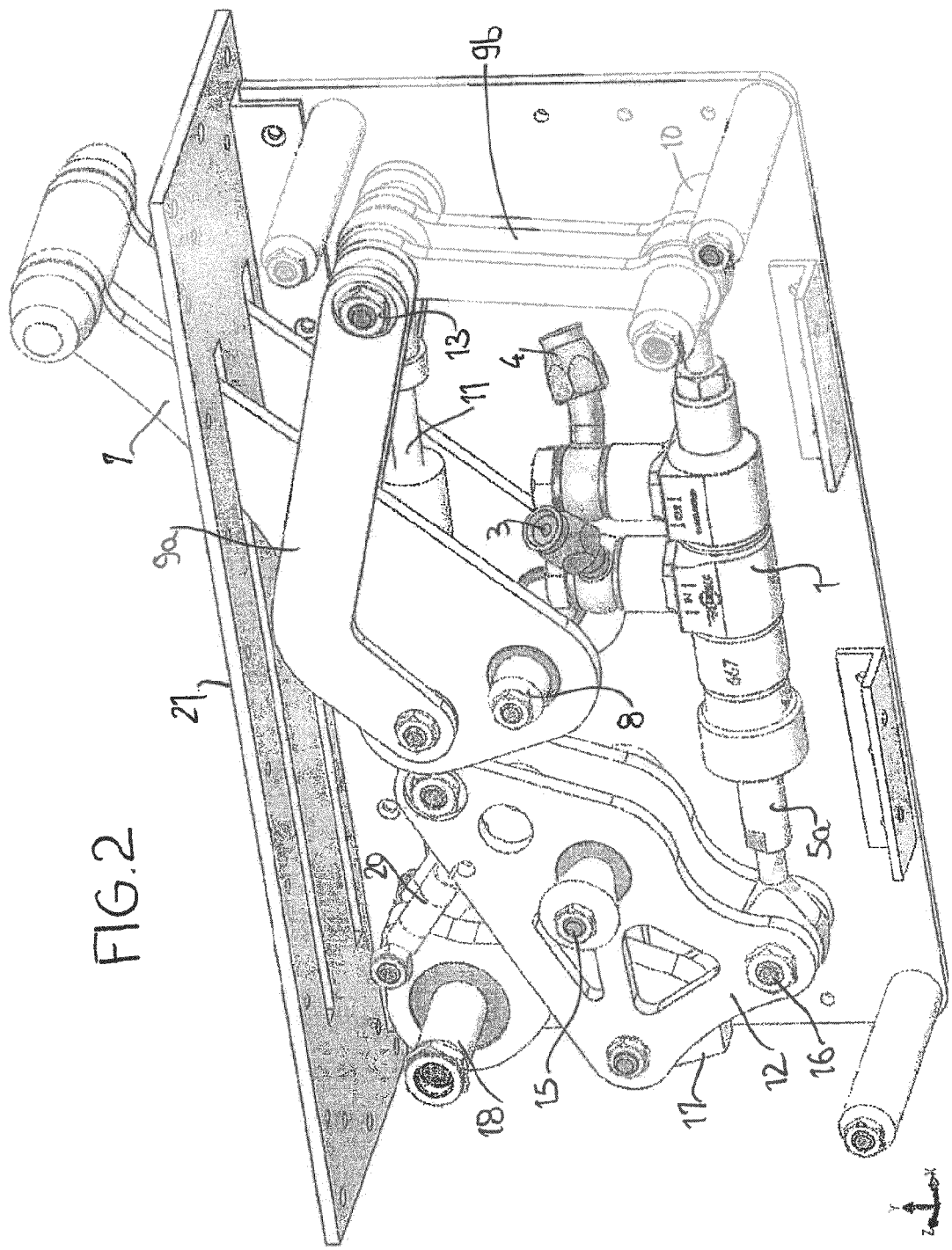
FIG. 2 is a view similar to FIG. 1 considered from another perspective angle.
Figure 3:
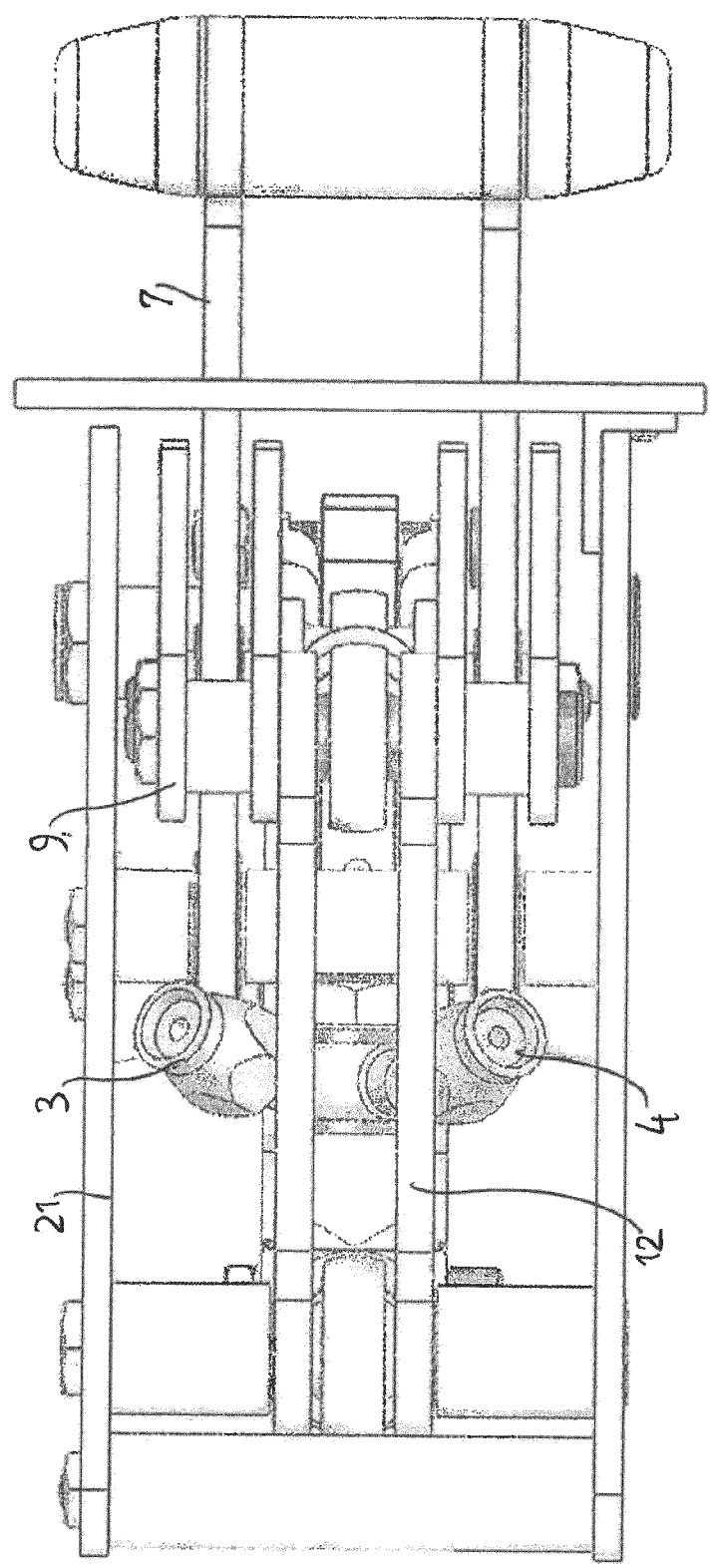
FIG. 3 is a plan view from above of the device.
Figure 8:
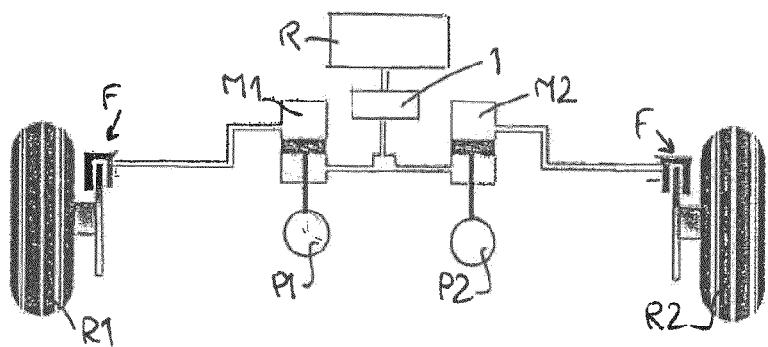
Figure 4:
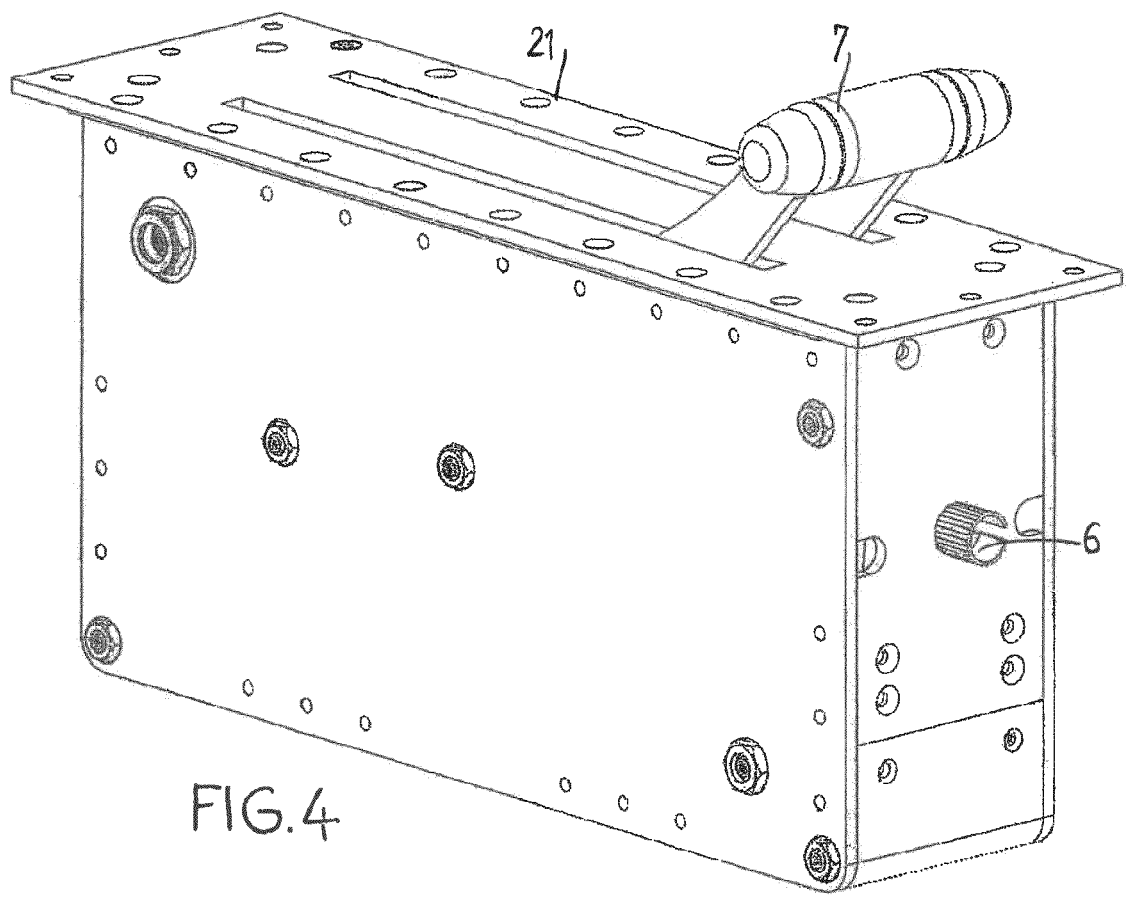
FIG. 4 shows the device as built into a protective housing.

FIG. 8 is a diagrammatic view showing the installation of the device in the case of a braking system for aircraft weighing less than 5.7 tonnes.

DETAILED DESCRIPTION

The inventive security braking device is intended to be mounted between a hydraulic fluid tank (R) and actuator members capable of acting on braking members (F). To be more specific, the security braking device can be used to particular advantage in the case of a brake system for aircraft weighing less than 5.7 tonnes. In this case, the device is mounted between the hydraulic fluid tank (R) and the master cylinders (M1) and (M2) each dependent upon a pedal (P) for controlling the braking members (F) (FIG. 8).

The braking security device includes a loading and non-compression position locking mechanism for a master cylinder (1) hydraulically connected to the tank (R) by a connector (2) and to each of the braking members by connectors (3) and (4). The master cylinder is of any known and appropriate type, and has in particular a moving piston (5) whereof the rod (5a) extends beyond one of the ends of the master cylinder body (1).

According to one underlying inventive feature and as will be shown in further detail in the remainder of the description, the loading and locking mechanism is dependent upon a control member (6) which is capable of unlocking the mechanism in order to concomitantly urge the master cylinder (1) so that the latter applies a predetermined hydraulic pressure for acting, with the same force, on each of the braking members (F).

In the embodiment shown, said loading mechanism includes a lever (7) articulated on a fixed axis (8). Said lever (7) is connected via a link rod system (9) to one of the ends of the body of the master cylinder (1) considered on the opposite side from the projecting rod (5a) of the piston (5). Said link rod system (9) comprises at least one main elbow link rod (9a) articulated on a part of the operating lever (7). At its end, the elbow link rod (9a) is articulated on a rectilinear linkage (9b) articulated on a fixed part (10) of the body of the master cylinder (1).

The link rod system (9) is connected, by a resilient return member (11) capable of storing energy, to a rocking member (12). For example, said return member (11) is constituted by a gas actuator coupled, in an articulated way, on an axis (13) on which are articulated the ends of the link rods (9a) and (9b). At its other end, the member (11) is coupled to an axis (14) offered by part of the rocking member (12) mounted with swiveling capacity relative to a fixed axis (15). Another part of the actuation member (12) is articulated by an axis (16) at the end of the rod (5a) of the piston (5) of the master cylinder (1).

The rocking member (12) is mounted in combination with a swiveling hook (17) articulated on a fixed axis (18). The swiveling hook (17) is connected to the control member (6) and engages with a part of the rocking member in the form, for example, of a roller (19), said hook being returned into the locked position by a spring (20). The function of the hook (17) is therefore to hold the rocking member (12) in the locked position corresponding to the non-compression of the master cylinder (1).

In a position of the lever (7) corresponding to a so-called stop position (FIG. 5), the gas actuator (11) is not compressed, with the rocking member (12) being locked by the hook (17) which engages with the roller (19). As shown, in this position, the rod (5a) of the piston (5) of the master cylinder (1), is not urged, with the result that no pressure is applied to the master cylinder (1).

In another switched position of the lever (7), opposite to the previous one (FIG. 6), the device is in the so-called loaded position. In this position, the gas actuator (11) is compressed, the rocking member (12) being locked in the same way as in the so-called stop position shown in FIG. 5. As a result, in this so-called loaded position, the master cylinder (1) is not urged to pressure.

To apply automatic braking intended to send identical braking pressure to each of the braking members, the control member (6) has merely to be actuated, in order to correspondingly rock the hook (17) in order to release the rocking member (12). With the rocking member (12) being unlocked, the gas actuator (11) is able to expand causing, concomitantly, said member (12) to rock relative to the axis (15) and the rod (5a) of the piston (5) of the master cylinder (1) to be driven in, so as to subject the latter to hydraulic pressure of given intensity. This hydraulic pressure is equitably distributed and transmitted via the two orifices (3) and (4) to the braking members.

It should be noted that the action on the control member (6) may be manual or automatic, said member (6) being able to be triggered by any external action. Said control member (6) may be constituted by a cable coupled to the hook (17).

As the figures in the drawings show, the whole security device as specified is built, for example, into a sealed housing (21) offering any type of arrangement for actuating the operating and loading lever (7), and the control member (6). In this case, the aforementioned different axes (10), (13), (14), (8), (16), (18) are mounted transversely between the lateral sides of the housing (21). Reference should be made in particular to FIGS. 1, 2, 3 and 4, which show an example of the embodiment and assembly of the inventive security braking device.

As shown, the invention can be used to particular advantage in the case of a braking system for an aircraft weighing less than 5.7 tonnes. In this case, and as is shown in particular in FIG. 8, the master cylinder (1) is connected via the orifice (2) to the hydraulic tank (R) and, via the orifices (3) and (4) by means of a T, to each of the master cylinders (M1) and (M2) corresponding to each of the wheels (R1) and (R2) of the aircraft. The master cylinders (M1) and (M2) are each actuated by a pedal (P1) and (P2).

When the inventive braking security device is not actuated (FIG. 5), aircraft braking is performed conventionally by means of the pedals (P1) and (P2). Conversely if, for various reasons, the pilot is forced to apply emergency braking, the device being loaded (FIG. 6), all he has to do is to actuate, by any means, the control member (6) in order to unlock the rocking member (12) and urge the master cylinder (1) to pressure in order to send, in each of the master cylinders (M1) and (M2) dependent upon the braking members, an identical hydraulic pressure thereby ensuring straight-line braking.

It should be noted that, in the position shown in FIG. 7 corresponding to the triggering of the device, the latter constitutes to advantage a so-called parking brake.

The advantages are clear from the description, with the following in particular being stressed and restated:

the entirely mechanical design of the security braking device;

the adaptability of the braking device to a conventional system on an aircraft weighing less than 5.7 tonnes;

the effectiveness of the braking obtained which ensures that the aircraft stops in a straight line, consequently avoiding any swiveling or toppling effect thereof;

reliability of operation;

the building of the latter into an independent housing;

the possibility of replacing the master cylinder as a function of the required hydraulic pressure.

As shown, the device may be used, in the braking field, other than in a brake system for an aircraft weighing less than 5.7 tonnes.

The invention claimed is:

1. Security braking device mounted between a hydraulic fluid tank and actuation members capable of acting on braking members, comprising: a loading and non-compression position locking mechanism for a master cylinder hydraulically connected to the tank and to the braking members, said mechanism being dependent upon a control member for unlocking the mechanism in order to concomitantly urge the master cylinder to apply a predetermined hydraulic pressure for acting on the braking members, wherein the mechanism includes:

- an articulated lever connected via a link rod system to one end of a body of the master cylinder;
- a rocking member coupled, in an articulated way, to a rod of a piston of the master cylinder, said rocking member being dependent upon a resilient return member capable of storing energy; and
- a swivelling hook connected to the control member for engaging with a part of the rocking member to hold the rocking member in a locked position corresponding to non-compression of the master cylinder, said hook being returned to the locked position by a spring.

2. Braking device as claimed in claim 1, wherein the control member is coupled to a part of the rocking member so as to cause said rocking member, as said member is urged, to swivel and unlock so as to urge the piston rod of the master cylinder to apply the hydraulic pressure.

3. Braking device as claimed in claim 1, wherein, in one position of the lever, corresponding to a stop position, the resilient return member is not compressed, the rocking member is locked and the master cylinder is not urged to pressure, whereas in another position of the lever, corresponding to a loaded position the resilient return member is compressed, the rocking member is locked and the master cylinder is not urged to pressure.

4. Braking device as claimed in claim 1, wherein the resilient return member is a gas actuator.

5. Braking device as claimed in claim 4, wherein one end of the gas actuator is articulated on an axis of the rocking member, an other end of said actuator being coupled to the link rod system.

6. Braking device as claimed in claim 1, wherein the link rod system includes at least one main elbow link rod articulated on a part of the operating lever and at least one rectilinear linkage articulated on one end of the elbow link rod and on the end of the body of the master cylinder.

7. Braking device as claimed in claim 1, wherein the control member is a cable that can be actuated manually or automatically by being acted upon.

8. Braking device as claimed in claim 1, further including a sealed housing offering arrangements for actuating the lever and the control member.

9. A braking system of an aircraft weighing less than 5.7 tonnes, comprising the braking device of claim 1 and a master cylinder being hydraulically connected to a hydraulic fluid tank and to each of master cylinders of the aircraft corresponding to each of wheels and separately actuated by pedals.

* * * * *